United States Patent
Fujiwara et al.

(10) Patent No.: US 7,931,405 B2
(45) Date of Patent: Apr. 26, 2011

(54) SLIDING PART

(75) Inventors: Akira Fujiwara, Wako (JP); Morinobu Kawamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 579 days.

(21) Appl. No.: 12/101,466

(22) Filed: Apr. 11, 2008

(65) Prior Publication Data

US 2008/0273827 A1 Nov. 6, 2008

(30) Foreign Application Priority Data

Apr. 11, 2007 (JP) ................... 2007-103890

(51) Int. Cl.
*F16C 33/06* (2006.01)

(52) U.S. Cl. .................. 384/276; 384/625; 384/913

(58) Field of Classification Search .................. 384/276, 384/492, 625, 912, 913
See application file for complete search history.

(56) References Cited

U.S. PATENT DOCUMENTS

| 6,068,568 | A | 5/2000 | Kozakura et al. | |
|---|---|---|---|---|
| 2002/0072444 | A1 | 6/2002 | Matsuno et al. | |
| 2003/0198417 | A1* | 10/2003 | Yamamoto et al. | 384/492 |
| 2006/0094551 | A1 | 5/2006 | Tohara | |
| 2006/0120644 | A1* | 6/2006 | Smith | 384/276 |
| 2006/0269763 | A1 | 11/2006 | Nakano et al. | |
| 2009/0046967 | A1* | 2/2009 | Pope et al. | 384/492 |

FOREIGN PATENT DOCUMENTS

| EP | 1 729 032 A | 12/2006 |
|---|---|---|
| GB | 2 320 214 A | 6/1998 |
| JP | 2000-249196 A | 9/2000 |
| JP | 2006-132637 A | 5/2006 |
| WO | WO 02/02843 A2 | 1/2002 |

* cited by examiner

*Primary Examiner* — Thomas R Hannon
(74) *Attorney, Agent, or Firm* — Arent Fox LLP

(57) ABSTRACT

A sliding part comprises a first sliding member made of a steel, a second sliding member made of a steel, a first carbide film comprising a carbide and formed on the surface of the first sliding member, and a second carbide film comprising a carbide and formed on the surface of the second sliding member. The first sliding member and the second sliding member slide relative to each other while applying loads on each other. The carbide of the first carbide film and the carbide of the second carbide film differ from each other, and the hardness ratio of the first carbide film and the second carbide film is not more than 1.4.

4 Claims, 4 Drawing Sheets

SLIDING PART

BACKGROUND OF THE INVENTION

1. Technical Field

The present invention relates to a sliding part, such as a chain for vehicle, in which plural links are connected by pins.

2. Background Art

A chain for transmitting power from a driving portion to a driven portion is formed by connecting plural links endlessly by pins. The link and the pin are assembled so as to rotate with respect to each other, and the inner peripheral surface of the link and the outer peripheral surface of the pin slide relative to each other while the chain is in operation. A type of chain called a "silent chain" is widely used as a driving chain for vehicles, such as a chain for camshafts, a chain for oil pumps, a chain for balancer shafts, and the like, and the silent chain does not make very much noise. Such a chain must exhibit low levels of elongation due to wear due to the link and the pin sliding relative to each other and becoming worn (see Japanese Unexamined Patent Application Publication No. 2006-132637).

The above patent document discloses a chain in which an inner peripheral surface of a link is formed with a film of CrC (chromium carbide), and an outer peripheral surface of a pin is formed with a film of VC (vanadium carbide) so as to harden the surfaces and prevent wear elongation. Recently, chains are required to have high strength and high wear resistance.

SUMMARY OF THE INVENTION

An object of the present invention is to provide a sliding part in which wear resistance is further improved.

The inventors have focused attention on a hardness ratio based on differences between the hardnesses of the surfaces of sliding members, and they have conducted intensive research. As a result, the inventors found that wear amount of the sliding members (total wear amount) can be decreased as the hardness ratio is reduced. The present invention has been completed based on this finding. The present invention provides a sliding part comprising a first sliding member and a second sliding member, and the first sliding member and the second sliding member slide relative to each other while applying loads on each other. A first carbide film including carbide is formed on the surface of the first sliding member, and a second carbide film including carbide is formed on the second sliding member. The carbide of first carbide film and the carbide of the second carbide film differ from each other, and the hardness ratio of the first carbide film and the second carbide film is set to be not more than 1.4. It should be noted that the hardness ratio represents a ratio of a greater hardness to a lower hardness, that is, a value obtained by dividing the greater hardness by the lower hardness, in a case in which the hardness of the first carbide film and the hardness of the second carbide film are different from each other. The present invention also includes a case in which the hardness of the first carbide film and the hardness of the second carbide film are the same, that is, a combination in which the hardness ratio is 1.0. The hardness ratio can be adjusted by changing the kind of the carbide used. When a carbide film is formed by plural carbides so as to obtain a multiphase, the hardness ratio can be adjusted by changing the ratio of the carbides used.

According to the present invention, the hardness of the carbide film formed on the surface of a sliding member is different from that of the carbide film formed on the surface of the other sliding member, and the hardness ratio is set to be an appropriate value (not more than 1.4). Accordingly, wear resistance of the sliding members is further improved. In this case, a combination of carbide films made of the same material is inappropriate because seizing easily occurs, even when the hardness ratio is 1.0. The reason that a hardness ratio of not more than 1.4 is appropriate is described hereinafter. When a carbide film having a greater hardness and a carbide film having a lower hardness slide relative to each other, a part of the carbide film having a greater hardness is peeled off by microscopic seizing, and particles that have fallen off dig into the surface of the carbide film having a lower hardness. As a result, the carbide film having a lower hardness into which the fallen particles dig wears the carbide film having a greater hardness. Such a wear phenomenon becomes obvious when the hardness ratio is more than 1.4, and the hardness ratio is therefore set to be not more than 1.4.

As a carbide film, a multiphase hard film in which carbide phases are dispersed in a matrix phase made of a carbide may be mentioned. In the present invention, the multiphase hard film is formed on at least one of a first sliding member and a second sliding member.

In the present invention, the first carbide film comprises a single-phase hard film made of a carbide, and the second carbide film comprises a multiphase hard film that is formed by dispersing carbide phases in a matrix phase made of a carbide. In this case, a lubricant exists between the surfaces of the first sliding member and the second sliding member, and the first sliding member and the second sliding member slide relative to each other. In the multiphase hard film of the second sliding member, the carbide phases, which are easily worn, are preferentially worn, and concave portions are formed between the residual carbides. As a result, the concave portions function as oil-pits, whereby good sliding properties can be obtained.

Specifically, a single-phase hard film made of chromium carbide may be used as a carbide film of the first sliding member, and a multiphase hard film, which is formed by dispersing at least one of a vanadium carbide phase and a titanium carbide phase in a matrix phase made of a chromium carbide, may be used as a carbide film of the second sliding member. These hard films can be formed on each surface of the sliding members by a diffusion coating. In this case, the hard film can be applied on each surface of the sliding members with good adhesion with respect to the base material. As a result, each hard film is firmly fixed to each sliding member and may not be peeled off.

In the following description, in a single-phase hard film of the first sliding member, a film made of chrome carbide is indicated by "CrC", a film made of vanadium carbide is indicated by "VC", and a film made of titanium carbide is indicated by "TiC". In addition, a multiphase hard film, which is formed on the second sliding member by dispersing VC in a matrix phase made of CrC, is indicated by "CrVC", and a multiphase hard film, which is formed on the second sliding member by dispersing TiC in a matrix phase made of CrC, is indicated by "CrTiC".

As described above, CrC is preferably used for a single-phase hard film of the first sliding member and a matrix phase of a multiphase hard film of the second sliding member. VC or TiC may also be used instead of CrC, but a single-phase hard film and a matrix phase of a multiphase hard film that are made of VC or TiC are easily peeled off from the surface of the base material. Moreover, since the temperature of the diffusion coating of VC or TiC is relatively high (not less than 900° C.), a steel, which is the base material, may deteriorate after the diffusion coating. On the other hand, diffusion coating of CrC can be performed at not more than 900° C., and a single-phase hard film and a matrix phase of a multiphase hard film that are made of CrC strongly adhere to the base material and have relatively high hardness.

When the surface of the first sliding member is formed with a single-phase hard film of CrC, and the surface of the second sliding member is formed with a multiphase hard film by dispersing at least one of the VC phase and the TiC phase in a matrix phase made of CrC, the following effect is obtained. That is, in the multiphase hard film of the second sliding member, a matrix phase made of CrC, which has a lower hardness than that of VC or TiC, is preferentially worn. In this case, CrC particles that fall out due to frictional wear are much smaller than the VC particles and TiC particles, whereby the VC particles and TiC particles may not fall out and will remain on the surface. Therefore, at the surface of the multiphase hard film of the second sliding member, at least one of the VC particles and TiC particles are dispersed protruding from the surface of the worn matrix phase, and concave portions are formed between VC particles, TiC particles, or VC particle and TiC particle. The concave portions function as oil-pits for holding a lubricant, thereby further improving lubricity. As a result, the first sliding member and the second sliding member slide relative to each other while a high degree of lubricating effect is obtained, and wear resistance thereof is thereby improved.

According to the present invention, a carbide film is formed on each surface of the sliding members that slide relative to each other, and the hardness ratio of the carbide films is appropriately set, whereby wear resistance of the sliding members is further improved. Moreover, the carbide film of the present invention is preferably used for high-strength members.

BRIEF DESCRIPTION OF DRAWINGS

FIG. 8A shows a sliding surface of the pin material, and FIG. 8B shows a sliding surface of the link material.

FIG. 9A shows a sliding surface of the pin material, and FIG. 9B shows a sliding surface of the link material.

EMBODIMENTS OF THE INVENTION

A preferred embodiment of the present invention will be described with reference to the figures hereinafter.

Figure 1:
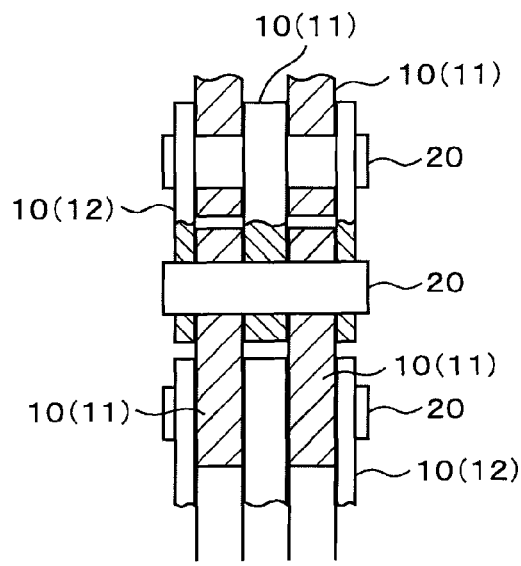
FIG. 1 is a cross sectional view showing a part of a silent chain in a preferred embodiment to which the present invention is applied.

FIG. 1 shows a part of a silent chain of a preferred embodiment to which the present invention is applied. The chain has a structure in which links 10 are arranged in plural rows and are connected by pins 20. The link 10 comprises an inner link 11 and an outer link plate 12 that extends from the inner link 11 to an adjacent inner link 11. The pin 20 is inserted into the link 10 and is rotatable with respect to the link 10. In this silent chain, the link 10 corresponds to the first sliding member of the present invention, and the pin 20 corresponds to the second sliding member of the present invention.

The silent chain is put around a driving sprocket and a driven sprocket (not shown in the figure), and power from the driving sprocket is thereby transmitted to the driven sprocket. While the silent chain is operated, specifically when the link 10 and the pin 20 pass through bent portions of each sprocket, the link 10 and the pin 20 apply large loads on each other and are easily worn. The silent chain of the embodiment of the present invention may be used as driving chains for vehicles, such as a driving chain for camshafts, a driving chain for oil pumps, a driving chain for balancer shafts, and the like.

The above link 10 and the pin 20 are made of an appropriate steel such as a carbon steel or an alloy steel, and the surfaces of the link 10 and the pin 20 are formed with the following hard film. The surface of the link 10 is formed with a single-phase hard film: CrC, which is made of chrome carbide. On the other hand, the surface of the pin 20 is formed with a multiphase hard film: CrVC, in which vanadium carbide (VC) particles are dispersed in a matrix phase made of chrome carbide (CrC), and the particle diameter of the vanadium particles is the same or greater than that of the particles in the matrix phase. In this case, the combination of the link 10 and the pin 20 that are formed with a hard surface is indicated by "CrC—CrVC".

In the present invention, the multiphase hard film of the second sliding member (in this case, the pin 20) may be made of CrTiC. CrTiC is formed by dispersing titanium carbide (TiC) particles in a matrix phase made of chrome carbide (CrC), and the particle diameter of the titanium carbide particles is the same or greater than that of the particles in the matrix phase. In this case, the combination of the first sliding member and the second sliding member is indicated by "CrC—CrTiC". In addition, a mixture of VC and TiC may be used as the carbide particles to be dispersed in a matrix phase of the multiphase hard film.

When the link 10 and the pin 20 slide relative to each other, the single-phase hard film CrC of the link 10 and the multiphase hard film CrVC of the pin 20 slide relative to each other in a condition in which a lubricant exists therebetween. In the multiphase hard film CrVC, the matrix phase made of CrC is preferentially worn, and VC particles will not fall off and remain on the surface of the multiphase hard film CrVC because the fallen off CrC particles are much smaller than VC particles. Therefore, in the surface of the multiphase hard film CrVC, VC particles are dispersed protruding from the surface of the worn matrix phase CrC, and concave portions are formed between VC particles. The concave portions function as oil-pits for holding a lubricant, thereby further improving the lubricity.

Figure 2:
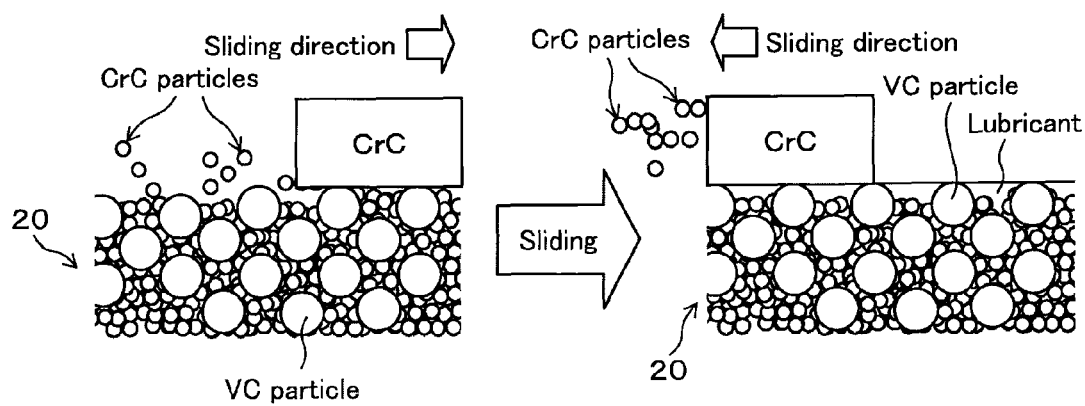
FIG. 2 is a schematic drawing showing a function for obtaining a lubricating effect by sliding a facing material (first sliding member: CrC) on a multiphase hard film of CrVC of a second sliding member.

FIG. 2 shows a function for obtaining a lubricating effect by sliding a facing material (a single-phase hard film: CrC) on a multiphase hard film CrVC of the surface of the pin 20. The left side of the figure shows an initial stage of the sliding, in which CrC particles of the multiphase hard film fell off by frictional wear. CrC particles are relatively soft and have a small diameter, whereby CrC particles are easily discharged to the outside of the frictional wear system. After the sliding was performed for a certain period, in the surface of the multiphase hard film, VC particles are dispersed protruding from the worn matrix phase CrC, and concave portions are formed between VC particles. The concave portions function as oil-pits for holding a lubricant, thereby further improving the lubricity. CrC is used as a facing material in FIG. 2, and this effect can be obtained when a steel including Fe that is a base material is used as the facing material.

As a method for forming a single-phase hard film CrC on the surface of a link and a method for forming a multiphase hard film CrVC on the surface of a pin, the following diffusion coating may be mentioned. CrC can be formed on the surface of a link in a furnace filled with a treatment agent for diffusion coating including three kinds of treatment agents, that is, a powder including chromium (for example, chromium metal), a sintering inhibitor (for example, alumina: $Al_2O_3$), and a promoter (for example, halides such as an ammonium chloride: $NH_4Cl$), and a link is inserted into the furnace and is heat treated at 850 to 900° C. On the other hand, CrVC can be formed on the surface of a pin in a furnace filled with a treatment agent for diffusion coating in which VC particles are mixed into the above three kinds of treatment agents, and a pin is inserted into the furnace and is heat treated at 950 to 1050° C.

CrVC film is required to be thicker than conventional films so as to improve bonding strength between CrC and VC and to improve durability of the pin. Accordingly, the treatment temperature is set to be relatively high considering that the pin is made of a high-carbon steel. On the other hand, since the link is made of a medium carbon steel that deteriorates when heated at more than 900° C., the treatment temperature is set to be lower than that for the pin. In this case, a film having thickness sufficient to ensure the durability thereof cannot be formed when the treatment temperature is less than 850° C., whereby the treatment temperature is set to be 850 to 900° C.

Embodiments

The effect of the present invention will be demonstrated by way of specific embodiments of the present invention.
1) Wear Test 1

Figure 3:
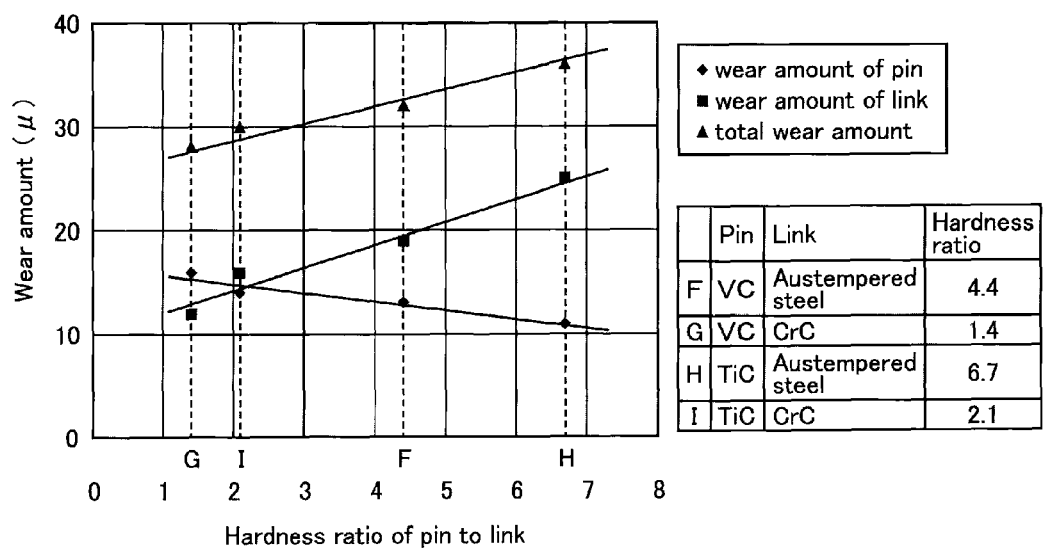
FIG. 3 is a graph showing results of a wear test 1 that was performed on an embodiment.

The right side of the graph in FIG. 3 shows combinations F to I of a pin and a link that were face-hardened. Roller chains were experimentally formed by the combinations F to I and were operated, and wear amounts of the pins, wear amounts of the links, and total wear amounts of the pins and the links were assessed. In this case, the link was formed by performing a commonly known austempering treatment on a steel so as to improve toughness, wear resistance, and impact resistance, and to decrease strain and change in dimensions. In the austempering treatment, a steel material was heated to 800 to 900° C. in a non-oxidizing atmosphere and was isothermally hardened in a salt-bath at 250 to 400° C.

Figure 4:
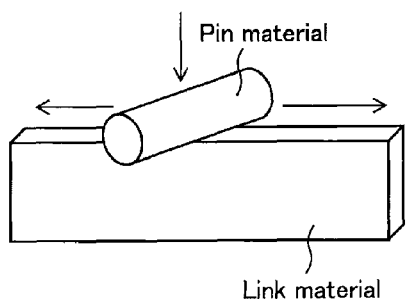
FIG. 4 is a perspective view showing a method of a seizing test that was performed on an embodiment.

In the operating condition of the roller chain, numbers of teeth of sprockets at both sides were 18T and 36T, the number of rotations of the sprocket with 18T was 8000 rpm, and the tension of the chain was 186 kgf, and a lubricant 10W-30 to which a contaminated oil was added at 0.73% was used at 1 L/min at 80 to 90° C. According to the graph shown in FIG. 3, a lower hardness ratio is preferable from the viewpoint of the total wear amount.
2) Seizing Test As shown in FIG. 4, a seizing test was performed by sliding a pin material on a link material while applying a load, and a limit for seizing was investigated in addition to investigating contact surface pressure and frictional load of the link material and the pin material. Samples used in this test were formed by combinations of "link material that is a first sliding member (material of a single-phase hard film) and a pin material that is a second sliding member (material of a multiphase hard film)". There were five kinds of combinations, which are shown in the following A to E. It should be noted that "hardness ratio" means the "ratio of hardness of the pin material to hardness of the link material" in the following description.

A: CrC—CrTiC
 hardness ratio 1.4 (corresponds to the present invention)
 (CrTiC of the pin was a multiphase hard film in which titanium carbide particles were dispersed in a matrix phase made of chromium carbide, and particle diameter of the titanium carbide particles was the same or greater than that of the particles in the matrix phase)

B: CrC—CrVC
 hardness ratio 1.2 (corresponds to the present invention)
 (CrVC of the pin was a multiphase hard film in which vanadium carbide particles were dispersed in a matrix phase made of chromium carbide, and the particle diameter of the vanadium carbide particles was the same or greater than that of the particles in the matrix phase)

C: CrC—VC
 hardness ratio 1.4 (corresponds to the present invention)
 (VC was formed on the surface of the pin and was a single-phase hard film including vanadium carbide)

D: CrC—CrC
 hardness ratio 1.0 (comparative example that is outside the scope of the present invention)
 (the hardness ratio corresponds to the present invention, and the pin and the link were made of the same material)

E: Fe—VC
 hardness ratio 4.4 (comparative example that is outside the scope of the present invention)
 (the link was made of a steel including Fe and did not have a hard film)

The seizing test was performed at a sliding rate of 0.53 m/sec and a sliding stroke of 20 mm until the sliding could not be performed due to seizing, while the load was increased by 10 kg each 5000 cycles of a sliding cycle (reciprocated number) and measured values were obtained. The sliding was performed by filling a low-viscosity oil (5W-20 at approximately 100° C.) between the link material and the pin material.

Figure 5:
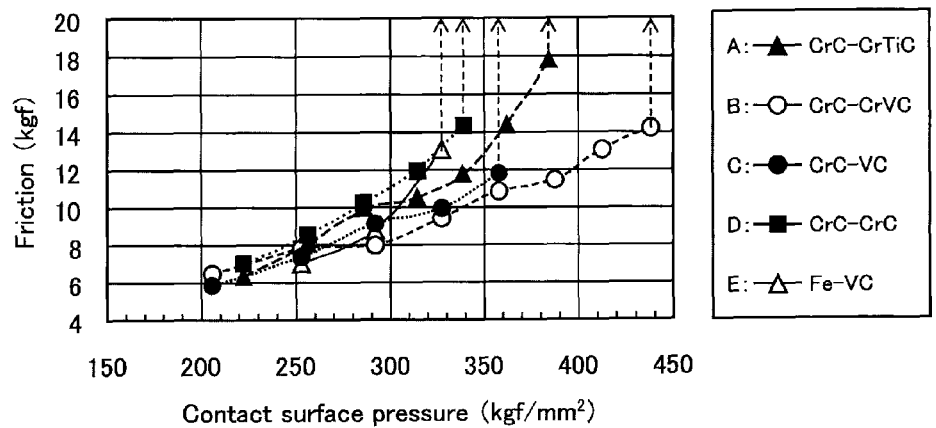
FIG. 5 is a line graph showing results of the seizing test.
Figure 6:
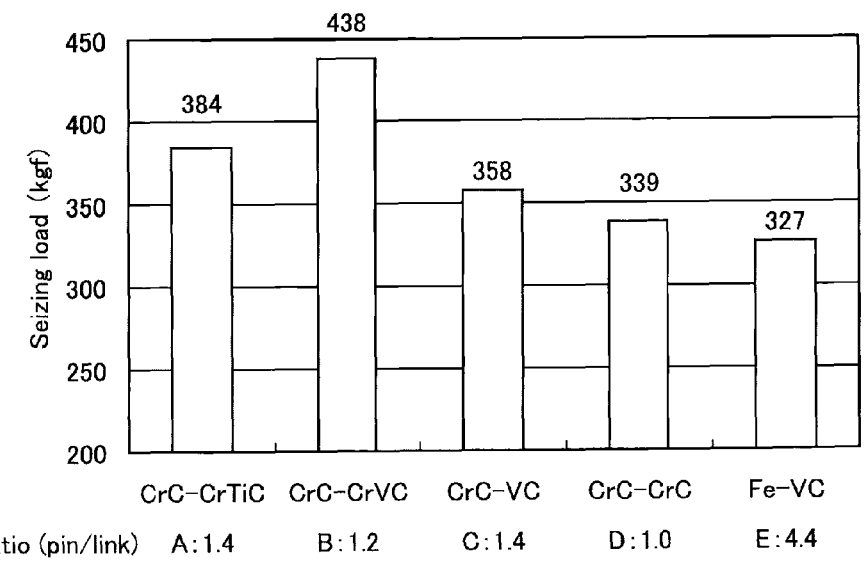
FIG. 6 is a bar graph showing results of the seizing test that was performed on an embodiment.

FIG. 5 shows the results of the seizing test performed by using the above combinations A to E of the link material and the pin material and shows the relationship of contact surface pressure and frictional load. FIG. 5 shows up-arrows (↑) that indicate the occurrence of seizing. FIG. 6 shows loads when the combinations A to E seized. According to these results, the combination of CrC—CrVC (the above B) of the present invention exhibited the largest contact surface pressure. In the combination of CrC—CrVC, frictional load was not high, and seizing load, that is, the limit for seizing is the greatest. The combination of CrC—CrTiC (the above A) of the present invention exhibited seizing load and contact surface pressure that were next highest to those of the combination of CrC—CrVC, and the combination of CrC—CrTiC was effective to prevent seizing. In each of the combinations A and B, carbide particles (VC and TiC), which are easily worn, were preferentially worn in the multiphase hard film of the pin, and concave portions might be formed between the residual carbide particles as oil-pits. As a result, preferable sliding properties were obtained. In the combination of CrC—VC (the above C) of the present invention, single-phase hard films slid with respect to each other, and the sliding properties were thereby inferior to those of the above A and B in which one of the sliding members was formed with a multiphase hard film.

However, since the hardness ratio of the above C was 1.4, the sliding properties were superior to those of the comparative example (D and E).

On the other hand, in the case of the combination of CrC—CrC (the above D), the hardness ratio was 1.0, and the sliding members were made of the same material. In the case of the combination of Fe—VC (the above E), the hardness ratio was 4.4 and was very large. Therefore, in the combinations D and E, the seizing load was low, and the sliding properties were inferior.

3) Wear Test 2

Figure 7:
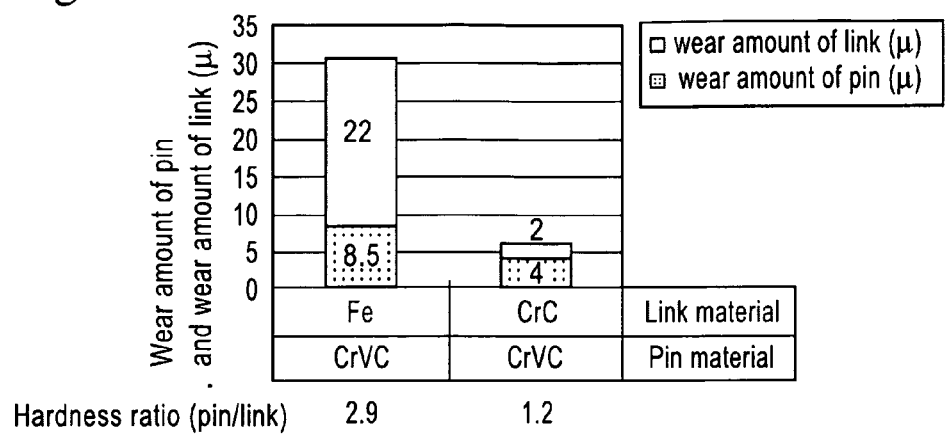
FIG. 7 is a graph showing results of a wear test 2 that was performed on an embodiment.

FIG. 7 shows two combinations of a link (first sliding member) and a pin (second sliding member) that were face-hardened. Silent chains were experimentally formed by the two combinations and were operated, and wear amounts of the links, wear amounts of the pins, and total wear amounts of the links and the pins were assessed. In this case, the combination of "Fe—CrVC" and "CrC—CrVC (the present invention)" were used for the combination of the link material and the pin material. In the operating condition of the chain, the numbers of teeth of sprockets at both sides were 18T and 36T, the number of rotations of the sprocket with 18T was 8000 rpm, and the tension of the chain was 186 kgf, and a lubricant 10W-30 to which a contaminated oil was added at 0.9% was used at 1 L/min at 80 to 90° C. The chains were operated for 50 hours.

FIG. 7 shows the results of the wear tests of the silent chains. According to the graph in FIG. 7, the wear amount was small when the hardness ratio was low. Specifically, in the combination of "CrC—CrVC" of the present invention, in which the surface of the link was CrC, and the surface of the pin was CrVC, the wear amount was very small.

Figure 8A:
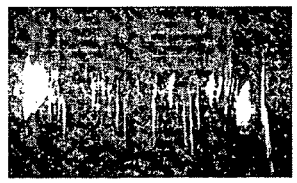
FIGS. 8A and 8B are photographs showing wear conditions when a combination of a pin material and a link material, which is outside the scope of the present invention, was used.
Figure 8B:
Figure 9A:
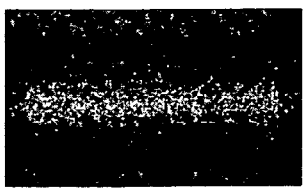
FIGS. 9A and 9B are photographs showing wear conditions when a combination of a pin material and a link material, which is in the scope of the present invention, was used.
Figure 9B:

FIGS. 8A and 8B show photographs of wear conditions of a chain formed by the combination of Fe—CrVC (the surface of the link was Fe and was hardened, and the surface of the pin was CrVC and was hardened) shown in FIG. 7. FIGS. 9A and 9B show photographs of wear conditions of a chain formed by the combination of CrC—CrVC of the present invention shown in FIG. 7. In the combination of Fe—CrVC, the pin shown in FIG. 8A and the link shown in FIG. 8B exhibited sharp lines in the circumferential direction, and seizing occurred. On the other hand, in the combination of CrC—CrVC of the present invention, the pin shown in FIG. 9A and the link shown in FIG. 9B exhibited no damage and showed a mirror surface at the sliding surface, and the effect of the present invention was obtained.

What is claimed is:

1. A sliding part comprising:
   a first sliding member made of a steel;
   a second sliding member made of a steel, the first sliding member and the second sliding member sliding relative to each other while applying loads on each other;
   a first carbide film comprising a carbide and formed on a surface of the first sliding member; and
   a second carbide film comprising a carbide and formed on a surface of the second sliding member,
   wherein the carbide of the first carbide film and the carbide of the second carbide film differ from each other, and the hardness ratio of the first carbide film and the second carbide film is not more than 1.4.

2. The sliding part according to claim 1,
   wherein at least one of the first carbide film of the first sliding member and the second carbide film of the second sliding member comprises a multiphase hard film which is formed by dispersing carbide phases in a matrix phase made of a carbide.

3. The sliding part according to claim 2,
   wherein the first carbide film of the first sliding member comprises a single-phase hard film made of a carbide,
   wherein the second carbide film of the second sliding member comprises a multiphase hard film formed by dispersing carbide phases in a matrix phase made of a carbide,
   wherein a lubricant exists between the surfaces of the first sliding member and the second sliding member.

4. The sliding part according to claim 3,
   wherein the single-phase hard film of the first carbide film of the first sliding member is made of a chrome carbide,
   wherein the multiphase hard film of the second carbide film of the second sliding member is formed by dispersing at least one of a vanadium carbide phase and a titanium carbide phase in a matrix phase made of a chromium carbide.

* * * * *